United States Patent Office 2,774,659
Patented Dec. 18, 1956

2,774,659

POLYMERIZATION PRODUCTS OF UREA AND ALPHA,BETA UNSATURATED ACIDS USED AS SOIL CONDITIONER

Gerhard Abel and Theodor Volker, Darmstadt, Germany, assignors to Rohm & Haas G. m. b. H., Darmstadt, Germany No Drawing. Application August 25, 1953, Serial No. 376,520

Claims priority, application Germany August 25, 1952

18 Claims. (Cl. 71—28)

It is known to react urea with $\alpha,\beta$-unsaturated carboxylic acids of the general formula $$R_1R_2C = CR_3 - COOH$$

in which $R_1$, $R_2$ and $R_3$ may be hydrogen, alkyl, alkenyl, aryl or aralkyl, for example, acrylic acid, methacrylic acid and their homologues, for example ethacrylic acid $\alpha$-phenylacrylic acid and other $\alpha$-substituted acrylic acids, at temperatures of 100 to 130° C. There are produced resinous bodies with regard to the constitution of which nothing definite is known. Upon heating the said reaction components to temperatures of 200° C. and above, there is produced inter alia hydrouracil or its derivatives in accordance with E. Fischer, Berichte der deutschen chemischen Gresellschaft, vol. 34, page 3759.

It has been found that the reaction products produced at temperatures below 200° C. are polymerizable. The initial reaction and also the subsequent polymerization take place particularly easily under the influence of from 0.05 to about 1%, preferably 0.5% of catalysts or accelerating compounds such as per salts, peroxides, for instance, benzoyl peroxide, lauroyl peroxide, cumenehydroperoxide, tertiary butyl hydroperoxide, ditertiary butyl peroxide, hydrogen peroxide and others, or azo compounds such as azodiisobutyric acid dinitrile and triphenylmethyl azo benzene and like polymerization accelerators or under the action of heat and therefore, in general under conditions under which radical chain polymerizations take place. The reaction temperature can lie within the range from about 80 to 200° C., preferably from 100 to 140° C., and the reaction usually is complete in from ½ to 1 hour. Oxygen and the known inhibitors exercise an inhibiting action also in this connection; there is, therefore, concerned a true polymerization. The polymerization can be carried out in any way, preferably as bulk-polymerization. It is possible to co-polymerize other polymerizable compounds, e. g., methyl methacrylate therewith, in which case the necessary water-solubility of the products obtained or their salts must be taken into consideration when selecting the components of the co-polymerization and determining their quantities.

The bulk-polymerized products obtained are colorless, vitreous, hard, generally brittle compounds which retain their acid character and are not completely soluble in water but are completely soluble in alkalis and give solutions varying from a highly viscous to a mucilaginous nature.

The new polymerization products can be prepared, for instance, in the following manner:

By heating for about ½ hour a mixture of methacrylic acid and urea at elevated temperatures for instance between 100 and 130° C., a reaction takes place between the two components. The mol ratio of methacrylic acid to urea can vary within wide limits. Acid-urea ratios of 1:0.5 to 1:3 have proven advantageous. 0.05 to 0.1% benzoyl peroxide is added to the reaction mixture thus obtained and the mixture is polymerized at temperatures between 100 and 140° C. The molten mass which was originally clear changes in the course of this into a hard, infusible blistered product; this product still contains free carboxyl groups and is only partially soluble in water but readily passes into solution in the form of the ammonium salts, the alkali salts or mixed ammonium-alkali salts.

If the polymer obtained is reacted in a suitable state of subdivision with gaseous ammonia, there is obtained the white crumbly ammonium salt which is readily soluble in water and is suitable for instance, as set forth further below, for spreading or spraying.

Among the possible uses of the products prepared in accordance with the method of the invention, special mention is deserved by those in which use is made of the excellent agglomerating effect of the substances. This action can be used for instance, in order to improve the structure of soil, viz., of farm land. Even with very small additions of the products prepared in accordance with the invention, the soil assumes the desired crumbly nature which promotes drainage and ventilation of the ground, stabilizes the porous structure against the action of the elements, increases the water retention and in this way counteracts erosion. Due to this improvement in the structure of the soil, the growth of the roots and the pushing through of the young seedlings proceeds unhindered. The increased water retention furthermore, facilitates the metabolism of the plants. These favorable effects result in an increase in the crop yield. The products which have been described are applied either in the form of their aqueous solutions, i. e., sprayed onto the ground, or else they are spread in solid form, for instance, together with inorganic fertilizers. The quantities which should be used depend on the nature of the soil which is to be improved and can vary within wide limits. Even with quantities of only 0.01% based on the weight of the soil the structure of which it is desired to change, a considerable effect can be obtained.

The activity of the above-described substances as soil improving agents can be shown by the following simple comparative test. This test at the same time shows the surprisingly strong action of the new polymers which by far exceeds the action of the compounds which were previously known for this purpose, for instance polyacrylates.

The other conditions remaining the same, there was added to 1 kg. portions of soil one of the following:

Example A: 300 cc. water.
Example B: 300 grams solution containing 0.5 gram sodium polyacrylate.
Example C: 300 grams solution containing 0.5 gram of a product obtained by reacting molar quantities of methacrylic acid and urea, followed by polymerization of the reaction product and conversion of the latter into the water-soluble ammonium salt by the process of the invention.

It was found that after three hours, the following quantities of water had run off:

|  | Grams |
| --- | --- |
| Example A | 32 |
| Example B | 27 |
| Example C | 0 |

These examples show the extraordinary improvement obtained in the water retention of the soil.

The substances prepared in accordance with the invention have also proven to be excellently suited for the granulating or fertilizers, for instance. If a mineral fertilizer which is to be granulated is sprayed with, for instance, a 1% solution of a product prepared by the method of the present invention, with simultaneous mechanical shaking of the material followed by drying, there are obtained granules of particular uniformity and favorable dissolving properties.

The copolymerization of other polymerizable compounds with the monomeric reaction products of urea with an $\alpha,\beta$-unsaturated carboxylic acid may, for example, be carried out in the following manner, the parts being by weight. A mixture of 30 parts urea, 65 parts methacrylic acid and 5 parts methyl methacrylate is heated to 80° C. until a homogenous melt is obtained. Thereupon 0.5 part azodiisobutyric acid dinitrile are added and the monomeric reaction product is polymerized by heating for two hours at 120° C. The polymerization product thus obtained is a brittle, blistered resin which is water-soluble in the form of its alkali- or ammonium salt. A solution of the salt of the polymerization product is surprisingly effective as a soil conditioning agent even when added in a concentration of only 0.01% by weight, based on the weight of the soil.

We claim:

1. As new compounds, polymerization products of the reaction products obtained by reacting urea with $\alpha:\beta$-unsaturated acids of the general formula $H_2C=CRCOOH$ where R is selected from the group consisting of hydrogen, alkyl and aryl groups at an elevated temperature below 200° C.

2. A polymerization product of the reaction product obtained by reacting methacrylic acid and urea at an elevated temperature below 200° C.

3. As new compounds, the salts selected from the group consisting of the alkali metal and ammonium salts of a compound as claimed in claim 1.

4. As new compounds, the salts selected from the group consisting of the alkali metal and ammonium salts of a compound as claimed in claim 2.

5. A soil conditioning material including a compound as claimed in claim 1.

6. A soil conditioning material includng a compound as clamed in claim 2.

7. A soil conditioning material including a compound as claimed in claim 3.

8. A soil conditioning material including a compound as claimed in claim 4.

9. A granulated fertilizer containing a compound as claimed in claim 1.

10. A granulated fertilizer containing a compound as claimed in claim 2.

11. A granulated fertilizer containing a compound as claimed in claim 3.

12. A granulated fertilizer containing a compound as claimed in claim 4.

13. A process for the production of new polymerization products in which the reaction products obtained by reacting urea with $\alpha:\beta$-unsaturated acids of the general formula $H_2C=CRCOOH$ where R is selected from the group consisting of hydrogen, alkyl, and aryl groups at an elevated temperature below 200° C. are polymerized in the presence of a polymerization accelerator.

14. A process as claimed in claim 13 in which said acid is methacrylic acid.

15. A process as claimed in claim 13 in which the accelerator is selected from the group consisting of peroxides, peracids and azo compounds.

16. A process as claimed in claim 13 in which the polymerization is carried out at 100–140° C.

17. A process as claimed in claim 13 in which the molar proportion of urea to unsaturated acid is within the range of from 0.5 to 3.

18. A process as claimed in claim 13 in which other polymerizable compounds are copolymerized.

References Cited in the file of this patent

UNITED STATES PATENTS

| | | |
|---|---|---|
| 2,090,596 | Jacobson | Aug. 17, 1937 |
| 2,120,933 | Dittmar | June 14, 1938 |
| 2,132,671 | Bauer | Oct. 11, 1938 |
| 2,146,209 | Graves | Feb. 7, 1939 |
| 2,625,471 | Mowry et al. | Jan. 13, 1952 |